United States Patent [19]
Shirato et al.

[11] 3,755,293
[45] Aug. 28, 1973

[54] THE ANTIBIOTIC MINIMYCIN

[75] Inventors: Shiro Shirato; Junsaku Nagatsu; Mitsuo Shibuya, all of Tokyo; Yoko Kusakabe, Tokorozawa, all of Japan

[73] Assignee: Kaken Kagaku Kabushiki Kaisha, Tokyo, Japan

[22] Filed: Sept. 4, 1970

[21] Appl. No.: 69,782

[30] Foreign Application Priority Data
Sept. 5, 1969 Japan.................................. 44/69949

[52] U.S. Cl................. 260/209 R, 195/80, 424/180
[51] Int. Cl............................................. C07c 69/20
[58] Field of Search ...................... 260/209, 210 AB

[56] References Cited
UNITED STATES PATENTS
3,480,613  11/1969  Walton............................ 260/209 R

*Primary Examiner*—Lewis Gotts
*Assistant Examiner*—Johnnie R. Brown
*Attorney*—Oblon, Fisher and Spivak

[57] ABSTRACT

A novel antibiotic Minimycin characterized by a needle or pillar-like crystal form which is soluble in water and lower alcohols, but which is insoluble in nonpolar organic solvents, has been shown to be active against *Staphylococcus* and *Colibacillus*, which are ordinarily resistant to other antibiotics.

1 Claim, 2 Drawing Figures

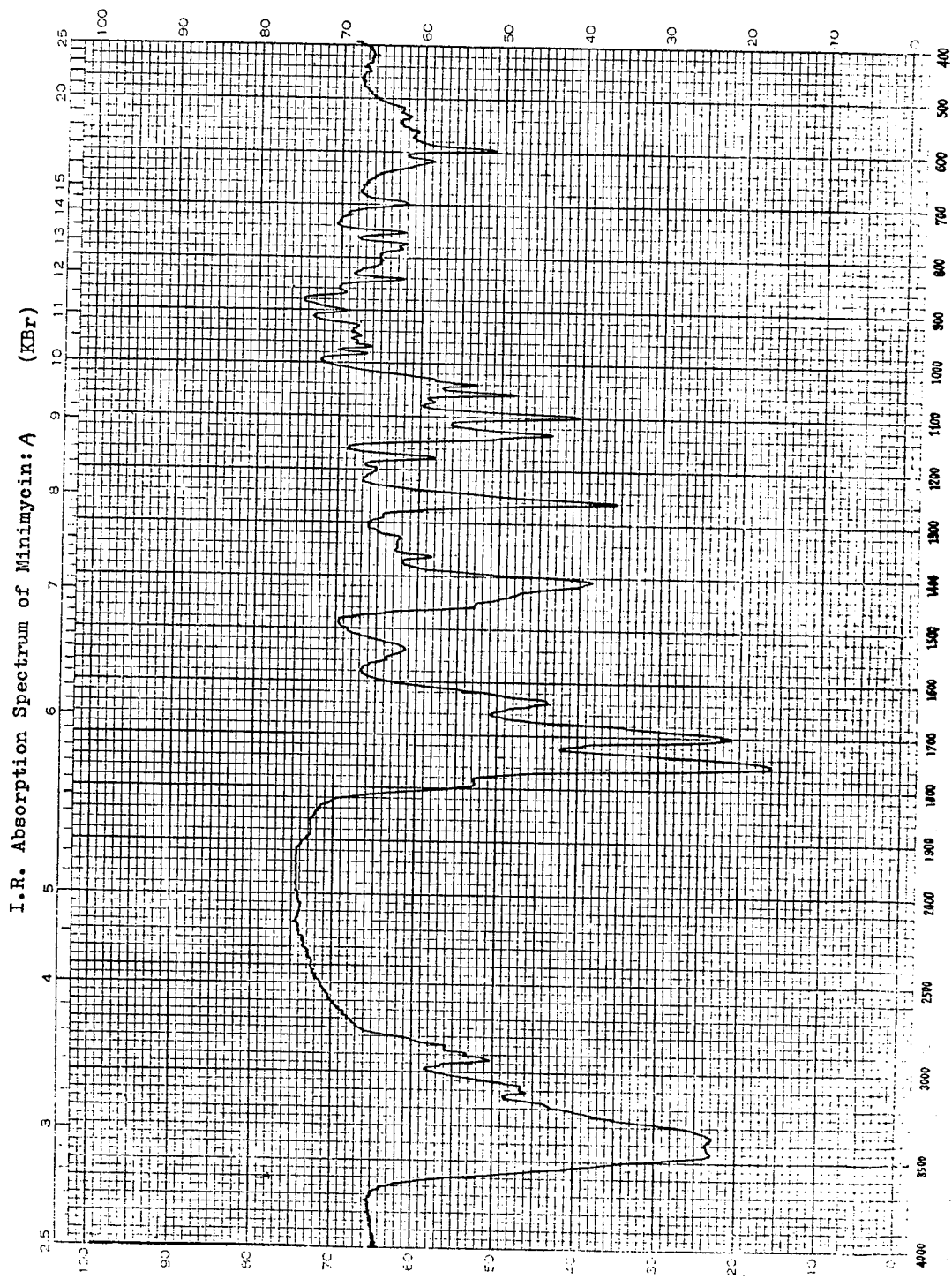

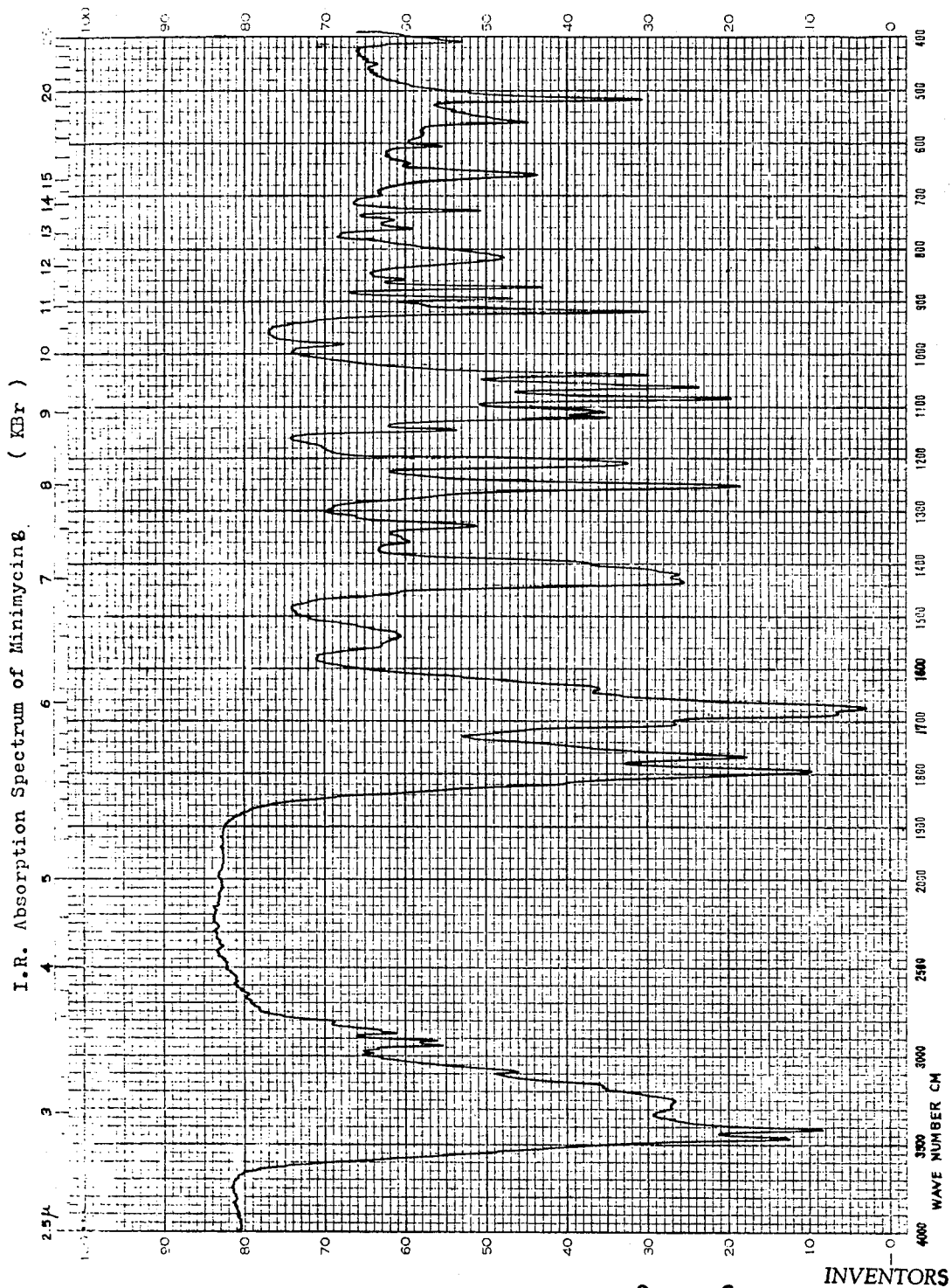

THE ANTIBIOTIC MINIMYCIN

BACKGROUND OF THE INVENTION

This invention relates to the novel needle or pillar crystal form Minimycin and, more particularly, to Minimycin which is produced by culturing a novel microorganism.

DESCRIPTION OF THE PRIOR ART

It has been known that the genus *Streptomyces* includes various species, some of which will produce antibiotics. However, a need exists for novel antibiotics which are effective against *Staphylococcus* and *Colibacillus*, which are resistant to penicillin, Streptomycin, Kanamycin, Tetracycline, Erythromycin, Chloramphenicol and Sulfonamide.

SUMMARY OF THE INVENTION

Accordingly, it is one object of this invention to provide a novel antibiotic which is effective against *Staphylococcus* and *Colibacillus* of the type which are resistant to Penicillin, Streptomycin, Kanamycin, Tetracycline, Erythromycin, Chloramphenicol and Sulfonamide.

DETAILED DESCRIPTION OF THE INVENTION

The novel antibiotic Minimycin is produced by culturing *Streptomyces sp* 80,432, a species of Actinomycetes. *Streptomyces sp* 80,432, has been isolated from a soil collection obtained from Nyugawa, Ehime Prefecture, and has been deposited in the Japanese Agency of Industrial Science, Fermentation Research Institute under the serial number of FERM–P 364. A deposit of this bacterium has been made with the American Type Culture Collection, Rockville, Maryland, and has been assigned ATCC No. 21589. *Streptomyces sp* 80,432 is characterized by similar properties as genus *Streptomyces* is Actinomycetes. Its cultural and physiological characteristics and carbon source utilization are shown in Tables 1, 2 and 3.

The morphological characteristics of *Streptomyces sp* 80,432 are as follows:

Vegetative mycelia never fragment into bacillary or coccorid elements when branched finely.

The sporophores are formed as compact spirals, primitive spirals or loops, but are sometimes straight.

The compact and primitive spirals of sporophores are occasionally observed to be spherical at the termination of the culture.

The structure of the spore surface is smooth, and the size of the spore is 1.0 – 1.2 × 0.8 μ.

Physiologically, the *Streptomyces sp* 80,432 is of the chromogenic type and is characterized by hygroscopic properties under specific cultural conditions.

TABLE 1 -

Cultural characteristics of *Streptomyces sp* 80,432 (observed at 27°C for 20 days)

| | Growth | Aerial Mycelium | Soluble pigment |
|---|---|---|---|
| Nurient agar | Poor and thin; colonial-yellow (2 ga) or Russet orange (4 nc) | None | None |
| Glucose nutrient agar | Good and thick; wrinkles; Light ivory (2 ca) to Russet orange (4 nc) | None | None |
| Trypton yeast extract agar | Poor or Moderate; Light ivory (2 ca) to pearl pink (3 ca) | None | Slightly dark brown |
| Potato glucose agar | Good and thick; wrinkles and rapid; colonial yellow (2 qa) or honey gold (21 c) | Quite scant and white; sometimes none formed | None |
| Yeast extract-Malt extract agar | Good and thick and wrinkled; Light amber (3 ic) to amber (3 nc) | Abundant; pearl gray (near grays 13 cb); sometimes partially hygroscopic | None or light brown |
| Oatmeal agar | Good and thin; white or yellowish white | Abundant and powdery; pearl gray (near grays 13 cb) or beige gray (near grays 3 ih); sometimes partially hygroscopic | None |
| Sucrose nitrate agar | Speedy, flat and thin; cream (1½ ca) | None | None |
| Glycerol nitrate agar | Poor and thin; light ivory (2 ca) | None | None |
| Starch agar | Flat and good; white to light apricot (4 ea) or light ivory (2 ca) | Abundant and powdery; pearl gray (near gray 13 cb) or beige gray (near gray 3 ih); sometimes partially hygroscopic; sometimes scant and white | None |
| Glucose asparagine agar | Poor and thin; colorless to light ivory (2 ca) | Medium or poor; white or pearl gray (near grays 13 cb); natural (near grays 3 dc) | None |
| Glycerol-Ca-malate agar | Good and wrinkles; white to light ivory (2 ic) | None or quite scant; white | None or slightly dissolving Camalate |
| Tyrosine yeast extract agar | Good and thick and wrinkled; mustard tan (2 lg) or dull gold (2 ng) | Surrounding of growth | Whole part of agar - black |
| Peptone iron agar | Medium or poor and thin; Brike maize (3 le) or Brite (3 ie) | None | Whole part of agar-black |
| Potato plug | Good and thick and wrinkled; Golden brown (3 pi) | None or quite scant; white | Black |
| Loffer's medium | Poor and thin; Brown | None | Slightly dark brown |
| Egg medium | Good and thick; dark brown | None | Dark brown |
| Glucose nitrate solution | Poor on surface as thin membrane | None | None |

Note: The color comparison is stated in Color Harmony Manual, 4th Edition (Container Corporation of America, Chicago, U.S.A., 1958)

TABLE 2 -

Physiological Reactions of *Streptomyces sp* 80,432

| Test | Response |
|---|---|
| Melanin formation: | |
| Peptone iron agar | Positive (2–3 days) |
| Tyrosin agar (ISP) | Positive (2–3 days) |
| Agar stab (Waksman 42) | Doubtful (14 days) |
| Tyrosinase reaction | Positive |
| Hydrogen sulfide production | Positive |
| Nitrate reduction | Positive |
| Liquifaction of gelatin | Negative |
| Milk: | |
| Peptonization | Positive |
| Coagulation | Negative |
| Cellulose utilization | Negative |
| Starch hydrolysis | Positive |
| Temperature range (pH 7.0) | No growth at 15°C and 50°C |
| pH range | Growth at pH 4.5 and pH 9.5 |

TABLE 3

Utilization pattern of carbon sources by *Streptomyces sp* 80,432
(27°C., 20 days) (T.G. Pridham & D. Gottlieb; J. Bact 56, 467, 1946)

| Carbon Source | Response |
|---|---|
| Glucose (Positive control) | + |
| No carbon source (Negative control) | − |
| Starch | + |
| Sucrose | + |
| Fructose | + |
| Maltose | ++ |
| Galactose | + |
| Lactose | ± to + |
| Arabinose | ++ |
| Melibiose | ++ |
| Raffinose | − to + |
| Cellobiose | ++ |
| Melezitose | + |
| Trehalose | ± to + |
| Rhamnose | − to ± |
| Mannose | ++ |
| Xylose | + |
| Salicin | − |
| Inulin | ± |
| Inositol | + |
| Dulsitol | − |
| Adonitol | − |
| Mannitol | + |
| Sorbitol | ± to + |

++: strongly positive
±: doubtful positive
+: positive
−: negative

The culture of *Streptomyces sp* 80,432, appears yellowish in coler when grown in a proteinaceous media. The same color is also observed when grown in a synthetic media.

In order to produce Minimycin by culturing the *Streptomyces sp* 80,432, conventional culturing methods of Actinomycetes, can be employed; on an industrial scale, aerobic culturing in a tank is preferable.

The accumulation of Minimycin in the media will be maximized by culturing at 20°–32°C., preferably 25°–29°C, for about 2–4 days. The cultured media is then filtered and the Minimycin is isolated and purified. Although Minimcyin can be absorbed by activated carbon over a wide pH range, it is preferable to absorb it at a pH of 2.0, from the point of view of stability and adsorption. After adsorption, the Minimycin-containing activated carbon is adsorbed, filtered and washed with water. The Minimycin is eluted from the activated carbon by treatment with a hydrophilic solvent such as 50 percent acetone-water. The solvent is distilled from the Minimycin solution in vacuo and Minimycin is isolated by chromatography using an activated carbon column. The resulting antibiotic active fractions are collected and distilled in vacuo to obtain a pure concentrated solution. The solution is filtered in a column containing a gel filter material and is eluted with water and fractionated. The antibiotic active fractions are collected and freeze-dried. A colorless needle crystalline form of Minimycin can be obtained by recrystallizing the resulting white power from water. In order to produce colorless pillar crystalline from Minimycin the resulting white powder is recrystallized from an appropriate organic solvent such as ethanol or acetone.

The Minimycin has the following properties:

1. Chemical structure:

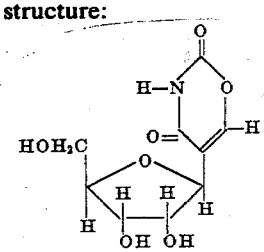

2. Colorless needle or pillar crystalline forms - melting point is 161°C. − 166°C. (Decomposition: needle − 166°C; pillar − 161°C).

3. Elementary analysis:
C: 44.15 percent; H: 4.62 percent; N: 5.84 percent; and O: 45.39 percent MW 245 (vapor pressure); Molecular formula − $C_9H_{11}NO_7$ 4. Solubility:
Soluble in water; soluble in lower alkyl alcohols; insoluble or less soluble in organic solvents (lyophilic).

5. Infrared spectrum:
Infrared spectrum of the needle crystalline type of Minimycin is shown in FIG. 1 and that of pillar crystalline type of Minimycin is shown in FIG. 2.

6. Ultraviolet absorption spectrum:
230 m$\mu$ shoulder (1 percent $H_2O$).

7. $[\alpha]_D^{25}$ + 18.0 (Cl, water).

8. Rf value on paper chromatography:
Rf values in various elutes are as follows:

| | |
|---|---|
| Water-saturated butanol | 0.25 |
| Butanol-Acetic acid-water (4:1:2) | 0.49 |
| Ethanol-Water (4:1) | 0.67 |
| Propanol-pyridine-acetic acid-water (15:10:3:12) | 0.85 |

9. Rf value on thin layer chromatography:
Rf values on silica gel thin layer are as follows:

| | |
|---|---|
| Water-Saturated butanol | 0.42 |
| Butanol-Acetic acid-water (4:1:2) | 0.57 |
| Ethanol-Water (4:1) | 0.75 |
| Chloroform-methanol-17% ammonia (2:1:1 upper layer of mixture) | 0.88 |

10. Color reaction:
Discoloring potassium permanganate;
Negative for ninhydrin reaction, anisaldehyde reaction, 2,3,5-triphenyltetrazoliumchloride reaction, Elson-Morgan reaction, Biuret reaction and Mohlish (yellow ring) reaction.

11. Heat stability:
Little decreasing of activity occurs by heating at 100°C for 10 minutes in pH 5 and pH 2. However, activity is decreased in pH 7 and pH 9 at 100°C for 10 minutes. No decrease in activity is found by heating at 50°C for 300 minutes at pH 5 and pH 2; however, a slight decrease of activity is found at pH 7 and pH 9. No decrease is found at 27°C for 24 hours at pH 2 − 8.

12. Antibiotical spectrum:
The obstruct areas resulted by the agar-disc diffusion method are stated, respectively, in the following Table.

TABLE 4

| Minimycin A mcg/ml | Staphylococcus sensitive strain (mm) | Staphylococcus durable strain (mm) | E. Coli sensitive strain | E. Coli durable strain |
|---|---|---|---|---|
| 400 | - | - | 23.0 | 21.3 |
| 200 | - | - | 21.3 | 19.8 |
| 100 | 24.7 | 25.0 | 18.5 | 16.5 |
| 50 | 20.6 | 21.5 | 16.5 | 14.7 |
| 25 | 17.3 | 18.5 | 14.5 | 13.5 |

By the term "durable strain of Staphylococcus" is meant a strain which is resistant to Penicillin, Streptomycin, Kanamycin, Chloraphenicol, Tetracycline, Erythromycin and Sulfonamide. By the term "durable strain of Colibacillus" is meant a strain which is resistant to Streptomycin, Kanamycin, Chloraphenicol, Tetracycline and Sulfonamide.

13. Toxicity:
Test mice were given intravenous injection of 100 mg/kg weight of the antibiotic. Half the mice died within 24 hours, and all of the mice died within 72 hours. However, by intravenous injection of 50 mg/kg, weight, all of the mice survived.

A further understanding of this invention can be obtained by reference to the following specific examples, which are provided herein for the purpose of illustration. In these examples, all percentages are intended to be referred to as percent by weight, unless otherwise stated.

EXAMPLE 1

100 liters of media containing 4.0 percent of grape sugar, 2.0 percent of soybean flour, 1.5 percent of wheat embryo bud, 0.4 percent of dried brewers yeast, 0.2 percent of salt, 0.2 percent of potassium chloride and 0.2 percent of calcium carbonate, is placed into a 200 liter tank. *Streptomyces sp* 80,432 is inoculated and cultured at 27°C for 72 hours by aerobic culturing. The product is filtered and the pH of the filtrate is adjusted to 2.0 by adding hydrochloride. 3 percent of activated carbon based on the weight of filtrate is added and the filtrate stirred. The same amount of diatomaceous earth is then added to the filtrate. The mixture is filtrated and the residuum is washed and mixed with a 50 percent acetone-water solution. It is then filtered and condensed in vacuo to obtain about 10 liters of concentrate. The concentrate is past downward from the top of the column packed with 6 liters of activated carbon, and then the column is washed with water and eluted with 20 percent acetone-water. The elute fractions having the strongest antibiotical activity are collected and condensed in vacuo to produce the pure concentrate. The pure concentrate is past downwardly from the top of the column packed with dilica (Sephadex G–10) and then is eluted with water. The antibiotical activity of each elute fraction is tested by disc-plate diffusion methods and the fractions having the highest antibiotical activity are collected, and freeze-dried to obtain a white powder of Minimycin.

EXAMPLE 2

The white powder of Minimycin obtained in Example 1 is recrystallized from water to yield 10 g of pure Minimycin having a colorless needle crystalline form. The melting point is 166°C (decomposition).

EXAMPLE 3

The white powder of Minimycin obtained in Example 1 is recrystallized from ethanol to yeild 10 g of pure Minimycin having a colorless pillar crystalline form. The melting point is 161°C (decomposition).

The results of the pharmacological test of Minimycin show that LD50 (ip) 50 mg/kg and Minimycin has high antibiotical activity especially for strains durable to other known antibiotics.

Having now fully described the invention, it will be apparent to one of ordinary skill in the art that many changes and modifications can be made thereto without departing from the spirit or scope of the invention. Accordingly,

What is claimed is:

1. An antibiotic, Minimycin, having the formula:

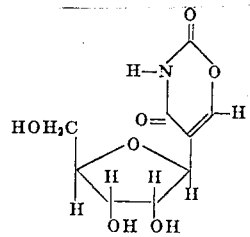

* * * * *